M. P. GILLEN.
VEHICLE SPRING.
APPLICATION FILED JUNE 21, 1916.
1,204,003.
Patented Nov. 7, 1916.
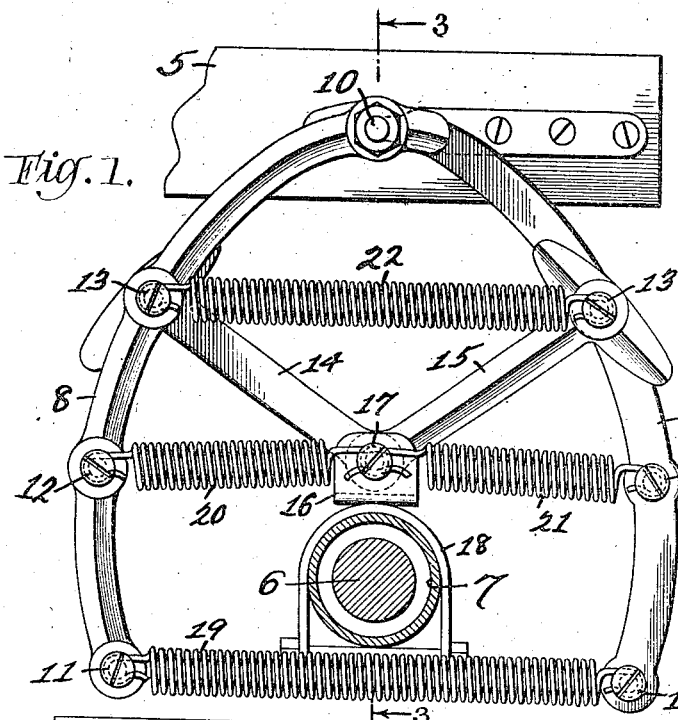
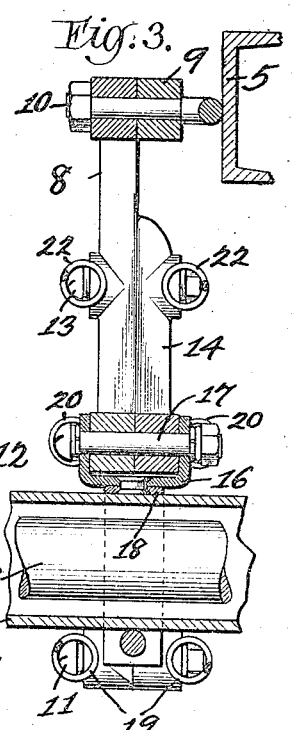
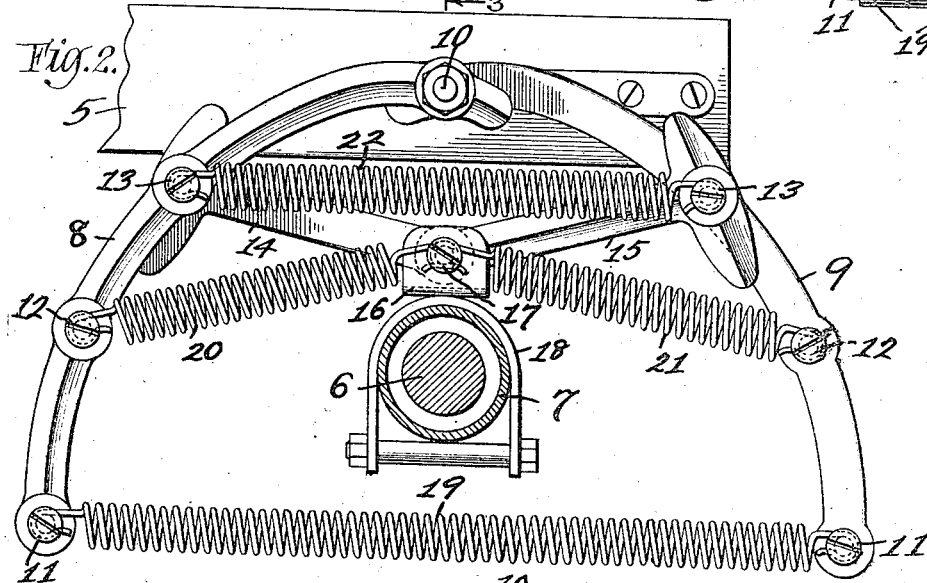
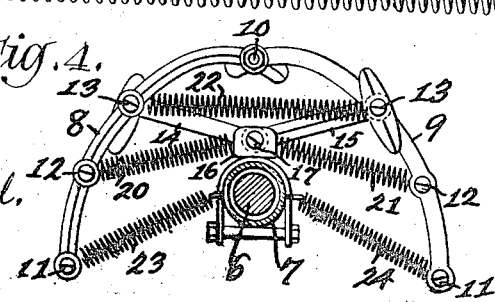
WITNESSES
Frederick Diehl.
J. E. Larsen
INVENTOR
Mark P. Gillen
BY
ATTORNEYS

UNITED STATES PATENT OFFICE.

MARK PASSMORE GILLEN, OF SAN DIEGO, CALIFORNIA.

VEHICLE-SPRING.

1,204,003.

Specification of Letters Patent.     Patented Nov. 7, 1916.

Application filed June 21, 1916. Serial No. 104,952.

*To all whom it may concern:*

Be it known that I, MARK P. GILLEN, a citizen of the United States, and a resident of San Diego, in the county of San Diego and State of California, have invented certain new and useful Improvements in Vehicle-Springs, of which the following is a specification.

My invention relates to vehicles, especially to automobiles, and the main object thereof is to provide resilient means between the frame and axles to take strains in a yielding though gradually resisting manner, whereby shocks to the occupants of the vehicle will be avoided while riding over rough roads or any surface inequalities.

A further object is to accomplish the above result by means of arms arranged in the manner of toggle-levers but with extended members which serve as the carrying means for certain springs to be hereinafter fully described.

My invention is fully set forth in the following specification, of which the accompanying drawings form a part, in which like characters refer to like parts in each of the views, and in which:—

Figure 1 is a side elevation of one of my devices in operative connection with the frame and an axle housing of a vehicle, and in normal position; Fig. 2 is a similar view but with the parts in depressed positions, as when taking a jolt; Fig. 3 is a section taken on the line 3—3 of Fig. 1; and Fig. 4 is a view similar to Fig. 2 but showing a modification thereover.

Referring to the drawings, 5 represents a portion of the frame of a vehicle, 6 one axle thereof, and 7 the housing for said axle, as at the rear wheels of automobiles, and I provide one of my resilient devices at each end of each axle and dispense with the conventional springs now used, a description of one of these devices being deemed sufficient both for illustration and description.

Each device consists of two arms 8 and 9 pivoted to the frame 5 and to each other at 10 and downwardly diverging, these arms being similar to each other and provided, each, with headed pins or screws 11 and 12 adjacent the lower ends thereof, and with headed pivots 13 interposed between the pins 12 and the pivot 10. The pivots 13 connect the respective arms 8 and 9 with equalizing levers 14 and 15 in turn pivoted together and to a saddle 16 at 17, the latter being secured to the axle housing 7 by means of a strap 18 or a suitable equivalent.

The pins 11 of the arms 8 and 9 serve as anchors for coil springs 19, and the pins 12 for springs 20 and 21 in turn held upon the pivot 17, while the pivots 13 serve as anchors for springs 22, the arrangement of springs shown as on one side of the arms 8 and 9 being duplicated on the opposite side thereof, thereby permitting the use of less powerful springs than if only one set was employed at one side of said arms.

The levers 14 and 15 are provided, each with a T-head or end which serves as a bearing for the movement of the respective one of the arms 8 and 9, in the movement of said arms and levers with respect to each other and as shown in Figs. 1 and 2, and the upper ends of the arms 8 and 9 are so formed as to present bearing surfaces for each other in any of the possible positions thereof.

The modification shown in Fig. 4 is substantially the same as the form already described, with the simple exception that the springs 19 are supplanted by springs 23 and 24 connected to the axle housing or to the strap 18, this form removing any springs from beneath the axle but operative in the manner of the first form.

As will be noted by reference to the normal and abnormal positions shown in the drawings, the lowermost springs are affected in the greatest degree, the springs 20 and 21 in somewhat less degree, and the springs 22 in least degree, this being because of the different lengths of movement of the respective pins and pivots on the arms 8 and 9, but all of the springs contribute to the strains brought to bear thereon in yieldingly resisting the same, the resistance being gradually increased until the strain is overcome after which the parts resume normal positions.

It will also be noted that the positive bearings between the saddle, equalizing levers, and arms, tend to prevent lateral movement of the frame 5 with respect to the vehicle wheels, and are resisted by the springs in a resilient manner and, while I have shown two perferred embodiments of my invention, it will be obvious that changes may be made thereover provided such changes come within the scope of the appended claims and within the spirit of the invention.

Having fully described my invention, what I claim as new, and desire to secure by Letters Patent, is:—

1. In a wheeled vehicle, a suspension for the frame comprising, at each axle end, two arms in pivotal connection, two equalizing levers pivoted to the respective arms and to each other, a plurality of springs joining said arms, and a plurality of springs joining said arms with the pivot of said levers.

2. In a wheeled vehicle, a suspension for the frame comprising, at each axle end, two downwardly divergent arms pivoted together and to said frame, two upwardly diverging levers pivoted together and to the respective arms, a saddle on the axle in pivotal connection with said levers at their common pivot, a coil spring joining the upper portions of said arms, at each side thereof, at the pivotal points with the respective levers, two springs on each side of said arms joining the latter with said saddle, and springs at the lower ends of said arms resisting separation thereof.

3. In a wheeled vehicle, a suspension for the frame comprising, at each axle end, two downwardly divergent arms pivoted together and to said frame, a saddle on said axle, two upwardly divergent levers pivoted together and to said saddle and to the respective arms, a coil spring at each side of said arms joining the latter at their pivotal connections with said levers, two coil springs at each side of said arms joining the latter with said saddle, and two springs at each side of said arms joining the outer ends thereof with said axle.

MARK PASSMORE GILLEN.